United States Patent
Coffey et al.

(10) Patent No.: US 10,701,016 B2
(45) Date of Patent: Jun. 30, 2020

(54) CONTENT-BASED EMAIL EXPIRATION

(71) Applicant: International Business Machines Corporation, Armonk, NY (US)

(72) Inventors: Brendan F. Coffey, Rhinebeck, NY (US); Gene Brown, Durham, CT (US); Clifford V. Harris, Jonestown, TX (US); Christopher J. Dawson, Arlilngton, VA (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/006,406

(22) Filed: Jun. 12, 2018

(65) Prior Publication Data

US 2019/0379625 A1    Dec. 12, 2019

(51) Int. Cl.
*H04L 12/58*     (2006.01)
*G06F 17/27*     (2006.01)
*G06F 40/30*     (2020.01)
*G06F 40/205*    (2020.01)

(52) U.S. Cl.
CPC ............ *H04L 51/22* (2013.01); *G06F 40/205* (2020.01); *G06F 40/30* (2020.01); *H04L 51/04* (2013.01)

(58) Field of Classification Search
CPC ..... H04L 51/22; H04L 51/04; G06F 17/2705; G06F 17/2785; G06F 16/162
See application file for complete search history.

(56) References Cited

U.S. PATENT DOCUMENTS

| | | | |
|---|---|---|---|
| 6,199,103 B1 | 3/2001 | Sakaguchi et al. | |
| 2006/0106914 A1 | 5/2006 | Plow et al. | |
| 2013/0218986 A1 | 8/2013 | Sobhani | |
| 2015/0331881 A1* | 11/2015 | Myles | G06F 16/162 707/689 |
| 2016/0119268 A1* | 4/2016 | Sharp | H04L 51/12 709/206 |

FOREIGN PATENT DOCUMENTS

WO    WO2009019480    2/2009

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

\* cited by examiner

*Primary Examiner* — Soe Hlaing
(74) *Attorney, Agent, or Firm* — Heslin Rothenberg Farley Mesiti P.C.; Michael Petrocelli, Esq.

(57) ABSTRACT

A method, computer program product, and a system where a processor(s) monitors a mailbox in an electronic mail system to identify a message destined for the mailbox. Based on identifying the message destined for the mailbox, the processor(s) apply contextual language analyses to parse content of the message (a header and a body of the message) to identify patterns in the content that indicate a temporal validity period for the message. The processor(s) determine, based on identifying the patterns, the temporal validity period for the message and associate an expiration date with the message, the expiration date coincides with an end of the temporal validity period. The processor(s) expire the message, at the expiration date.

20 Claims, 6 Drawing Sheets

CONTENT-BASED EMAIL EXPIRATION

BACKGROUND

A challenge to the efficiency of many computing environments is the volume of emails that are received, sent, and retained. Left unchecked, emails may continue to accumulate or proliferate and require discrete action by a receiver to manage them, i.e., delete or archive emails to manage usage of finite computing resources and guard performance efficiency of the resources. In order to address the challenges posed by email proliferation, some computing systems include mail retention programs that provide each email with a finite "shelf life" after which the email is deleted and/or archived. However, present mail retention approaches delete or expire email based largely on the timestamp of an email that delineates when it was received by a user. As a result, a system may retain inconsequential emails and expire or delete emails of high importance because the user failed to take active steps to prevent this deletion. A need exists for an automatic context-sensitive approach to email retention.

SUMMARY

Shortcomings of the prior art are overcome and additional advantages are provided through the provision of a method for automatically expiring messages in a mailbox. The method includes, for instance: monitoring, by one or more processors, a mailbox in an electronic mail system to identify a message destined for the mailbox; based on identifying the message destined for the mailbox, applying, by the one or more processors, contextual language analyses to parse content of the message, wherein the content comprises a header and a body of the message to identify patterns in the content that indicate a temporal validity period for the message; determining, by the one or more processors, based on identifying the patterns, the temporal validity period for the message and associating an expiration date with the message, the expiration date coinciding with an end of the temporal validity period; and expiring, by the one or more processors, the message, at the expiration date.

Shortcomings of the prior art are overcome and additional advantages are provided through the provision of a computer program product for automatically expiring messages in a mailbox. The computer program product comprises a storage medium readable by a processing circuit and storing instructions for execution by the processing circuit for performing a method. The method includes, for instance: monitoring, by one or more processors, a mailbox in an electronic mail system to identify a message destined for the mailbox; based on identifying the message destined for the mailbox, applying, by the one or more processors, contextual language analyses to parse content of the message, wherein the content comprises a header and a body of the message to identify patterns in the content that indicate a temporal validity period for the message; determining, by the one or more processors, based on identifying the patterns, the temporal validity period for the message and associating an expiration date with the message, the expiration date coinciding with an end of the temporal validity period; and expiring, by the one or more processors, the message, at the expiration date.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
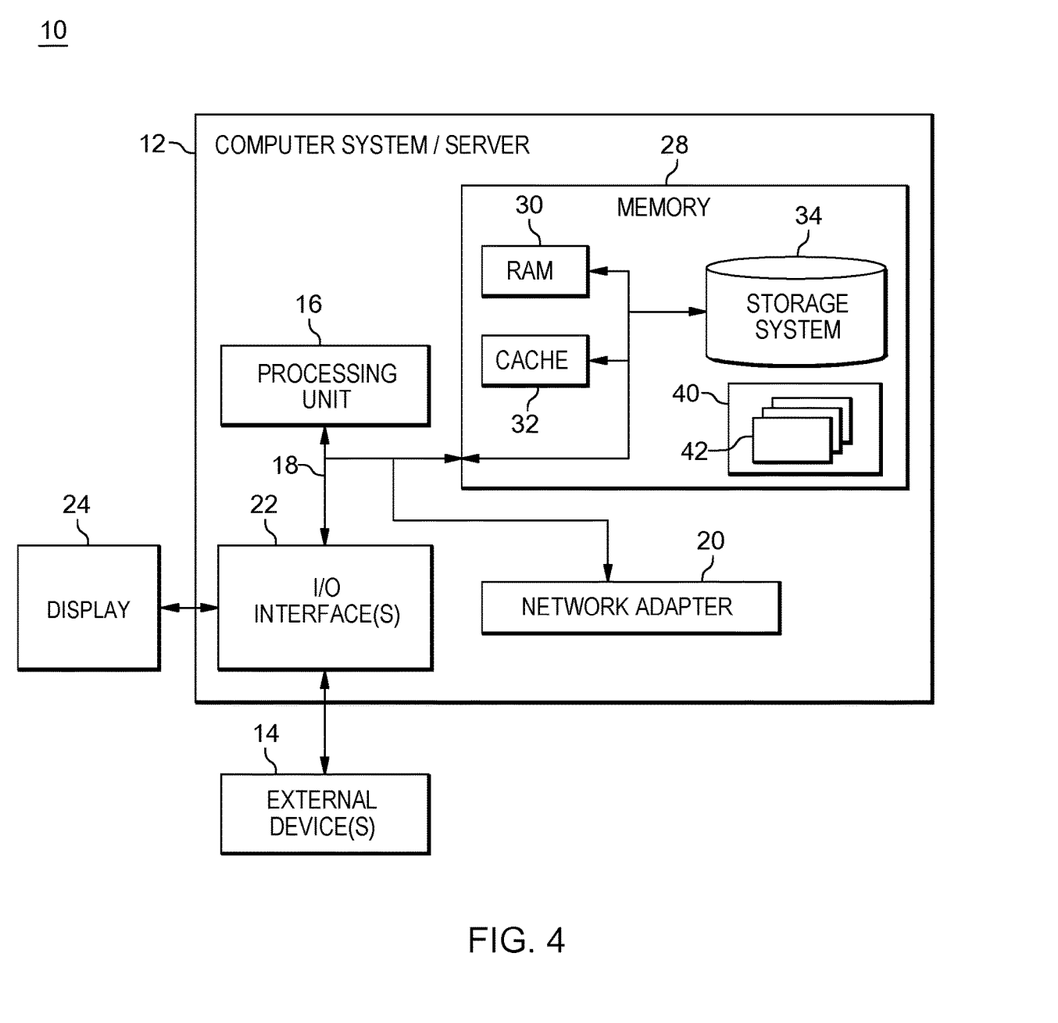
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include a computer-implemented method, a computer program product, and a computer system that include program code executed on at least one processing circuit that automatically expires messages in a mailbox (e.g., a user's inbox), based on analyzing the context in the content of the messages. In some embodiments of the present invention, the program code analyzes messages received and/or en route to a destination (e.g., user inbox) to identify contextual content within the email relating to a time-period of validity for the email. The program code may analyze the contextual content of a message by utilizing a cognitive analysis to identify a pattern within the message, to determine a period of validity of the message. The program code may analyze the contextual context by utilizing heuristic techniques and cognitive learning (e.g., based on a user's past behaviors) to determine a period of validity for the message. Based on the contextual content analysis, the program code automatically associates a time for expiration for the message with the message (e.g., date, time, interval, etc.).

The program code automatically expires the message in accordance with this associated time. In various embodiments of the present invention, the program code expires the message by taking various active measures. In some embodiments of the present invention, the program code expires the message by removing it from the computer resource where the file(s) comprising the message resides, and relocating the message to an alternate location (e.g., a backup memory resource). The program code may compress the message upon removal. In some embodiments of the present invention, the program code expires a message by deleting it. In some embodiments of the present invention, the program code may expire the message by making it inaccessible to the user who received the message by deleting, moving, or otherwise removing the email from an active view of a user.

Embodiments of the present invention are inextricably tied to computing because they are directed to providing an approach to storage and resource management in a computing system. The proliferation of email messages is a challenge unique to computing and is addressed with an approach that utilizes features of computing resources to guard the capacity, efficiency, performance, and efficacy, of a computing system. Absent aspects in embodiments of the present invention, the performance of the computing system would be compromised. Embodiments of the present invention provide significantly more than existing approaches to electronic mail retention and management because rather than applying a one-size-fits all approach to expiration of messages, for example, expiring messages based on the time they are received, embodiments of the present invention include program code that provides a contextual analysis of each email by individually determining the temporal validity period, and, therefore, a proper expiration date, for each message. Existing approaches delete, move, or otherwise remove email messages based on timestamps associated with those messages, while in embodiments of the present invention, the program code takes these actions based on a contextually-derived expiration date for each message.

Embodiments of the present invention provide advantages over existing approaches at least by expiring (e.g., deleting, moving, or otherwise removing) messages based on the content of the messages. Thus, aspects of embodiments of the present invention can retain relevant messages for longer periods of time and expire less relevant messages, improving the overall quality of the content of a given inbox, while maintaining performance of the computing system, as a whole.

Existing approaches that take into account the content of emails are manual. Users must indicates when a given message will be expired, which is time consuming and prone to user errors, unlike the automated content-based approach provided by embodiments of the present invention. In embodiments of the present invention, program code executing on at least one processing circuit automatically expires a message, removing it from the active inbox view, either through deleting, moving to a folder or another mechanism, by utilizing advanced analysis techniques and cognitive capabilities to determine the period of validity for the message.

In embodiments of the present invention, the program code utilizes computing technologies to enable the multi-factor cognitive analysis that results in the determination of a validity duration for each message handled by an electronic mail program. These determinations are both customized, as well as timely. As discussed herein, program code in embodiments of the present invention can utilize recent data in messages to adapt machine learning algorithms that the program code utilizes to determine this validity duration, taking into consideration textual content and temporal conditions, including but not limited to, textual patterns that indicate temporal qualities in the messages.

Some embodiments of the present invention provide advantages over existing approaches to mail retention because aspects of these embodiments enhance the security of the electronic mail system in which they are implemented. In embodiments of the present invention, as part of the contextual analysis, in addition to identifying time-expiration sensitive content, the program code can parse a message for content indicative of the message posing a security risk (e.g., spam, virus-related identifiers, malware indicators, etc.). Not only can the program code identify a potential security risk and as a result, immediately expire (e.g., move, delete, quarantine, etc.) the message, the program code can utilize the security risk in a contextual analysis and subsequently apply it to the messages of all users of the electronic mail system, to eliminate this risk in other messages.

Figure 1:
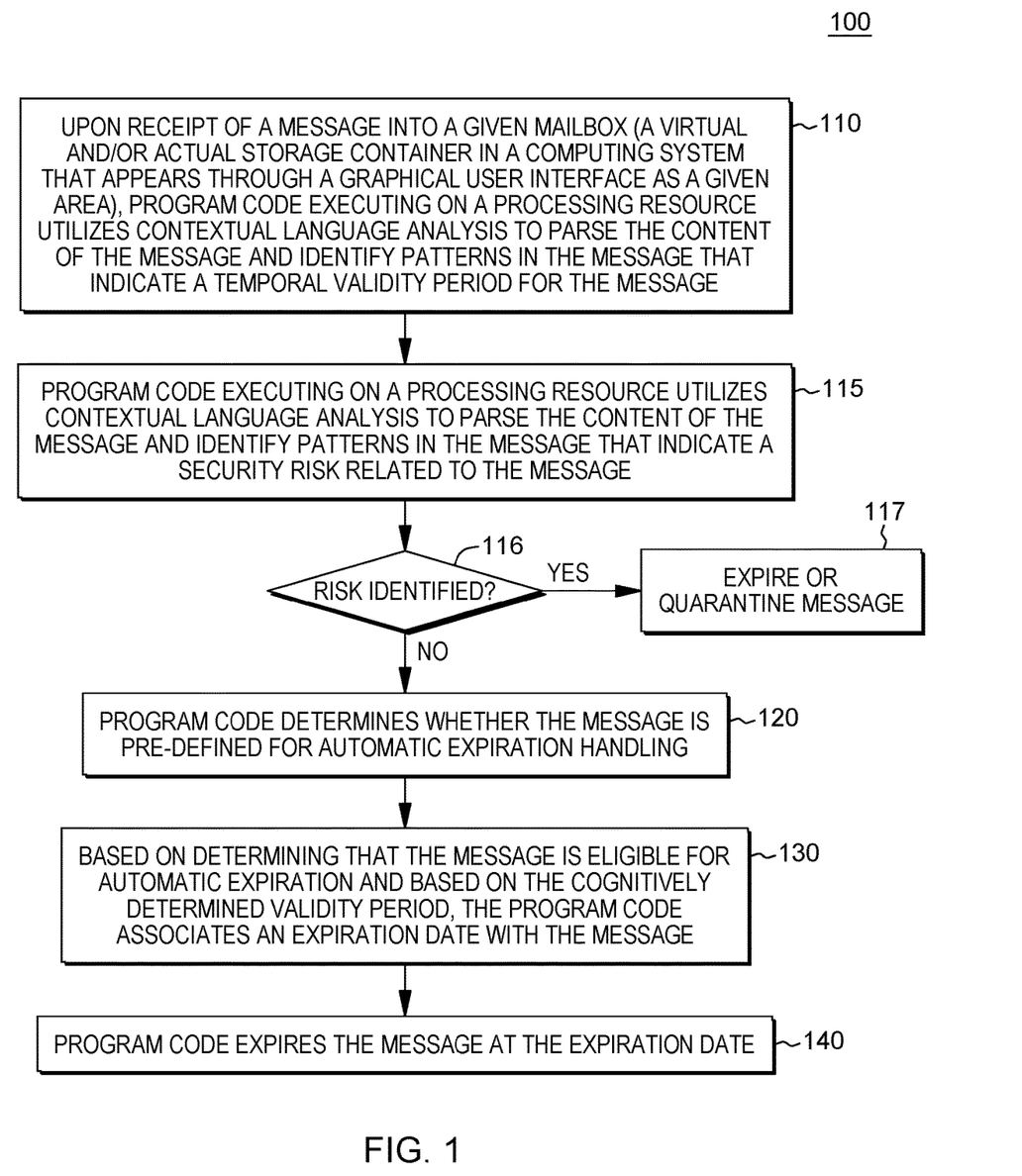
FIG. 1 is a workflow illustrating certain aspects of an embodiment of the present invention.

FIG. 1 is a workflow 100 that illustrates certain aspects of some embodiments of the present invention. In some embodiments of the present invention, upon receipt of a message into a given mailbox (a virtual and/or actual storage container in a computing system that appears through a graphical user interface as a given area), program code executing on a processing resource utilizes contextual language analysis to parse the content of the message and identify patterns in the message that indicate a temporal validity period for the message (110). In some embodiments of the present invention, the program code utilizes natural language processing algorithms and/or cognitive analytics to identify patterns within the content of the message indicative of a validity period for the message. For example, the program code may recognize various keywords within the body of the message which indicate a temporal validity for the email: sale, markdown, sale ends, dates in various formats, one day sale, event ranges, etc. The program code may also identify an email as having a static validity period, based on the sender. For example, certain advertisers, such as travel professionals, may send messages for deals that are only valid for a certain range of days. The program code may identify both keywords and patterns that define a temporal attribute of the message. The program code can (machine) learn various patterns and attributes each time the program code parses a new message, and can utilize a more voluminous and accurate group of patterns and keywords each time a new message is analyzed to determine a temporal validity period for that message.

In some embodiments of the present invention, the cognitive analysis is performed by one or more programs executed by a cognitive natural language processor. The cognitive natural language processor may include various APIs that process the text in each message, including data and metadata, either consecutively, or in parallel, in order to provide, efficiently, validity durations, for various messages, in a timely manner. The various APIs may include, but are not limited to, a tone analyzer API, a personality insight API, and a translation API. These APIs provide insight into the intended meaning of the text in the messages, which may provide insight to the program code of the cognitive natural language processor, when the program code determines whether the text is suggestive of a validity period. The cognitive natural language processor may be implemented as one or more of a deterministic system and/or a machine learning system.

In embodiments of the present invention, certain of the APIs may be part of a known cognitive agent, such as the IBM Watson® Application Program Interface (API), a product of International Business Machines Corporation. IBM Watson® is a registered trademark of International Business Machines Corporation, Armonk, N.Y., US. In some embodiments of the present invention, APIs utilized by the one or more programs may include, but are not limited to, Retrieve and Rank (i.e., a service available through the IBM Watson® Developer Cloud that can surface the most relevant information from a collection of documents), concepts/visual insights, trade off analytics, and/or relationship extraction.

In embodiments of the present invention, the program code identifies and processes both structured and unstructured data, in an email message, to provide a multi-factor cognitive analytics to aid in the definition of the validity range or period, and, ultimately, the expiration date, of the message. The diversity of the data and the ability of the one or more programs to synthesize a variety of data enables the one or more programs to factor information into the analysis, including temporal data, which is synthesized, in real-time, in order to realize the impacts of the data in a manner that provides an expiration for the message, without interfering with the efficiency of the email system. The temporal data identified by the program code included by the one or more programs in the cognitive analytics may include, but are not limited to, elements of a message header, text in a message body, metadata of the message, date and time indications, and/or words of a temporal nature (e.g., sale, seasonal, etc.). Based on the multi-factor analysis, in some embodiments of the present invention, the one or more programs provide a validity period for the message, which includes a date upon which to expire the message, as it will no longer be valid.

The program code may utilize a neural network in performing contextual language analysis. Specifically, in embodiments of the present invention, the program code may utilize a neural network to identify and weight patterns (e.g., textual sequences, textual excerpts, number sequences) to inform the assignment of a validity period to a message. As understood by one of skill in the art, neural networks are a biologically-inspired programming paradigm which enable a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network, including but not limited to, a cloud computing system. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Thus, by utilizing a neural network, in this case, for natural language processing, in embodiments of the present invention, the program code can locate patterns in the textual content of messages and utilize these patterns to classify the messages into different validity periods and/or assign varied expiration dates to the messages.

In some embodiments of the present invention, the program code may utilize past manual message expiration decisions in order to generate rules utilized by the program code in the cognitive analysis. For example, based on utilizing heuristic analysis techniques and cognitive learning, based on the user's past behaviors, the program code may determine that messages with certain content are quickly manually deleted from a given mailbox by a given user. Thus, the program code may automatically determine that messages that fit this description should have a short validity period.

In some embodiments of the present invention, the heuristic analysis techniques and cognitive learning, based on the user's past behaviors, can inform not only the contextual language analysis of subsequent messages for that user, but can also tune the contextual language analysis applied by the program code to all messages, including all the messages previously received by the user and/or all messages in the electronic mail system, in general. The program code may develop and/or enhance algorithms, heuristics, and/or rules from the electronic mail habits of one user and apply the machine learning to all users' electronic mail, both upon receipt and earlier received and retained messages. Once the program code generates or updates algorithms, heuristics, and/or rules for application to newly received messages as part of the contextual analysis, the program code may also apply these algorithms, heuristics, and/or rules to all the messages already resident in a user's mailbox, and/or to multiple users' mailboxes. Thus, messages received after these enhancements are made can receive the benefit for the enhancements.

In some embodiments of the present invention, the program code may recognize certain phrases or characteristics (e.g., patterns) as indicating a temporal validity period for a given message. For example, the program code may recognize certain keywords or phrases as indicating this temporal validity, including but not limited to: sale, discount, markdowns, seasonal special, sale ends or sale starts, followed by a recognized date formal, and/or a temporal period followed by the word "sale." The keywords and phrases may be defined in advance, but may also be machine learned by the program code through applying algorithms utilized in the natural language processing. In some embodiments of the present invention, messages from certain senders (retailers, wholesalers, etc.) may trigger the program code to recognize the message as a solicitation for a finite opportunity. In some embodiments of the present invention, the program code may identify a message as originating from a specific type of industry, such as a travel agency, suggesting to the program code a temporal validity, related to the opportunity advertised in the message. For example, certain types of travel may only be desirable and/or discounted seasonally, including specific modes of transportation, lodging, and/or destinations. In some embodiments of the present invention, the program code may identify invitations to events that are not sent via meeting notices, including both personal and professional events, such as appointments, classes, meetings, parties, anniversaries, weddings, etc. In some embodiments of the present invention, a user database may include mappings from various elements or patterns that may be identified by the program code in a given message to pre-defined validity periods. In some embodiments of the present invention, the program code consolidates identified attributes in a message into distinct components that trigger specific validity durations for the message.

Returning to FIG. 1, in some embodiments of the present invention, the program code executing on a processing resource utilizes contextual language analysis to determine whether the message includes a security concern (115). In some embodiments of the present invention, the program code performs the security analysis in advance of the program code parsing the message to locate objects in the message indicating a temporal validity of the message (110). Returning to the analysis to determine whether the message includes a security concern, the program code may utilize learned patterns, including keywords and phrases, to identify messages that may include indicators for spam, viruses, malware, etc. If the program code identifies a security concern in the message (116), depending on the configuration of this aspect, the program code may quarantine messages with these contents for further review and/or expire these messages automatically (117). In some embodiments of the present invention, the program code may scan the inbox of the user to see if the patterns that triggered the security concern are found in other messages. If the program code locates the patterns in other messages, the program code may expire or quarantine these messages for further review.

In some embodiments of the present invention, the program code determines whether the message is pre-defined for automatic expiration handling (120). In some embodiments of the present invention, certain message conditions can be utilized by the program code to determine if a message should be expired automatically, based on the program code automatically determining the temporal validity period for the message. These conditions may be defined through business rules that are both manually and automatically generated. For example, in some embodiments of the present invention, the program code classifies incoming messages based on message type (e.g., retail, business, general advertisement, family, greeting, message originating from a sender in an address book entry). As discussed above, certain APIs can be utilized to perform this clarification. Based on the message types, the program code may opt certain messages in or out (depending on configuration) of automatic expiration handling.

In some embodiments of the present invention, the program code may utilize heuristic algorithms or a rule based system, considering one or more parameters, in order to determine whether to apply cognitively-derived automatic expiration to a given message. In some embodiments of the present invention, one or more parameters of the message (e.g., header values, text in the body, etc.) may influence a rule that determines whether to subject the message to this automatic expiration processing. In making this determination, the program code may utilize one or more algorithms, heuristics, and/or rules. In embodiments of the present invention, the program code implements a decision on the message based on one or more elements of the message (e.g., a bit of a message, a value in the message, the presence or absence of a phrase in the message).

Based on determining that the message is eligible for automatic expiration and based on the cognitively determined validity period, the program code associates an expiration date with the message (130). In some embodiments of the present invention, the program code may determine that a message is eligible for automatic expiration (120), prior to parsing the message to locate objects in the message indicating a temporal validity of the message (110). However, as aforementioned, based on determining that the message is eligible for automatic expiration and based on the cognitively determined validity period, the program code associates an expiration date with the message (130).

The program code expires the message at the expiration date (140). Depending upon the embodiments of the present invention, the expiration date of the message can be implemented and the expiration can be provided by the program code utilizing a variety of available mechanisms and processes. For example, in some embodiments of the present invention, once the program code has determined an expiration date for a given message, the program code utilizes native expiration handling in the email program/client utilized (e.g., Outlook, Lotus Notes, etc.). In some embodiments of the present invention, program code runs as a background process/agent that complements the capabilities of the existing email client. For example, the program code, running as a background agent, can advance the capabilities around raw spam handing provided by the email client to be associated with indicators passed by the originating email system. In some embodiments of the present invention, the program code flags or tags message content using native expiration settings within the specific clients and/or generates and utilizes tagging that is compatible with the email client, including but not limited to, a standard proposed header tag (e.g., tags suggested by RFC 1036 or RFC 4021) or a field in a proposed header, to indicate an expiration date for a given message.

In some embodiments of the present invention, the program code may determine how to handle expired messages (e.g., delete, archive, move, etc.). The program code may generate, through heuristic analysis techniques and cognitive learning based on the user's past behaviors, a model for how a given user (and/or a typical user) disposes of expired emails. With this model, in some embodiments of the present invention, the program code may solicit the user, through a graphical user interface, to manually confirm handling of the expiring messages. In some embodiments of the present invention, the program code automatically disposes of expired messages in the manner revealed through the application of the heuristic analysis techniques and cognitive learning, based on the user's past behaviors.

In some embodiments of the present invention, the program code may provide periodic reminders to a user regarding when messages will be expired. In order to avoid perpetual reminders, the program code may associate expiration dates with messages that are a given consistent time period apart (e.g., three months, six months, etc.) and assign each message to an expiration date closest to the end of its validity period. Thus, the program code may provide these reminders only in advance of these pre-determined expiration dates.

Figure 2:
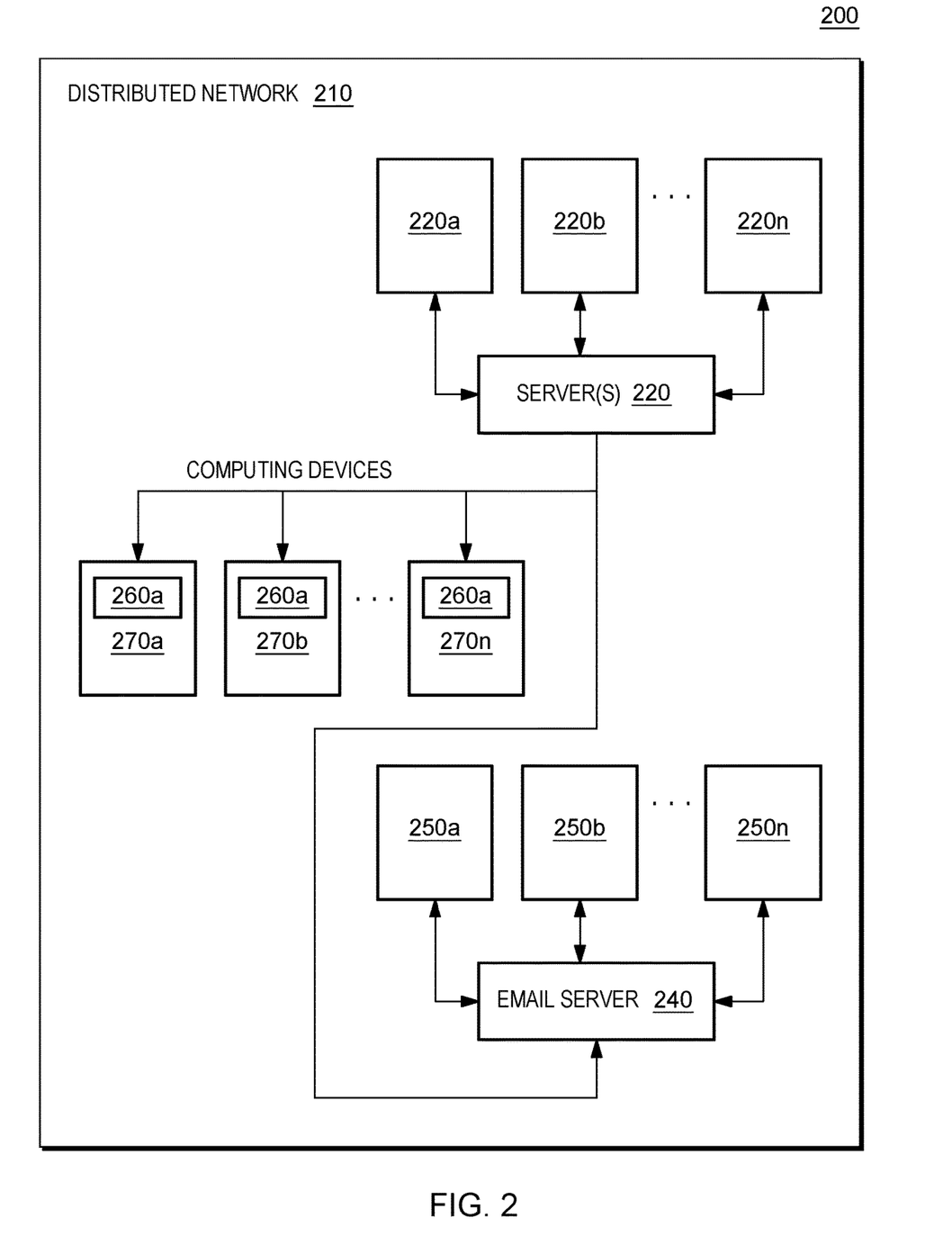
FIG. 2 is an illustration of various aspects of an environment in which aspects of embodiments of the present invention may be implemented.

Because implementations of electronic messaging systems vary, aspects of embodiments of the present invention may be implemented in varied hardware and software across shared computing environments. FIG. 2 is a technical environment 200 that includes a distributed network 210 and illustrates how embodiments of the present invention may be implemented in various components of a given distributed network 210. The technical environment includes one or more servers 220 that provide email as a service to a group of clients 230a-230n. The technical environment also includes an email server 240 that provides email to various computing devices 250a-250n. These devices provide a connection, such as a graphical user interface, which may be utilized to view various email messages and one or more mailboxes, but the (email) application is managed at the server 240. The technical environment 200 also includes email clients 260a-260n, which are installed on various personal computing devices 270a-270n.

The one or more servers 220 that provide email as a service to a group of clients 230a-230n, may be resources of a cloud computing system, and may provide email as a service utilizing web-based email programs. Embodiments of the present invention may be implemented on the one or more servers 220 to complement existing commercially available email programs, including but not limited to, Gmail, Yahoo! Email, Hotmail etc., which execute on the servers to provide the clients 230a-230n with email-as-a-service. The automatic message expiration in embodiments of the present invention may be offered to clients 230a-230n accessing email of the one or more servers 220 (e.g., over an Internet connection) as a standard or premium feature of the email service. The program code executing on the processing resources of the one or more servers 220 provides an efficient utilization/exploitation of cognitive systems to perform analysis/analyses and tagging of email, in order to automatically determine validity periods for the messages. In some embodiments of the present invention, based on analyzing the messages, the program code may generate custom display and handling options that are viewable and accessible via the 230a-230n accessing email of the one or more servers 220.

The email server 240 that provides email to various computing devices 250a-250n may provide the email based on executing an enterprise email solution, including but not limited to, Lotus Notes and/or Microsoft Exchange. Aspects of embodiments of the present invention may be installed on email server 240 as part of the enterprise solution. This implementation may provide cognitive analysis based on enterprise specific criteria, including applying the same machine learned heuristic analyses across multiple mailboxes. For example, the program code may train the cognitive analysis algorithms based on patterns observed across all clients of the enterprise system, allowing for the recognition of patterns not only specific to a user to govern the expiration of messages within the user's mailbox. Additionally, in some embodiments of the present invention, the program code may utilize uniform criteria to determine whether messages should be opted in or out of automatic validity period determination and subsequent expiration, allowing, for example, for message of a given status or urgency to be spared from this processing.

The email clients 260a-260n, which are installed on various personal computing devices 270a-270n, may executed program code that implements aspects of some embodiments of the present invention. These installed clients may include, but are not limited to, commercial client email applications such as Outlook Client, Mozilla Thunderbird, etc. Aspects of the present invention may be executed on processing resources of the clients as part of these email programs, an enhancement to the email programs, such that program code implements an expiration marking methodology that is compatible with the email clients 260a-260n (e.g., custom RFC822, or a methodology suggested by RFC 1036, RFC 4021). For example, header fields provide for options to handle expired emails which may include deleting, filing to a folder, changing the color in the inbox, etc. When the program code implements an expiration date, it may implement the expiration date in the header of a message in a manner that signals to the email clients 260a-260n how the given message should be expired, when the expiration date is reached.

Figure 3:
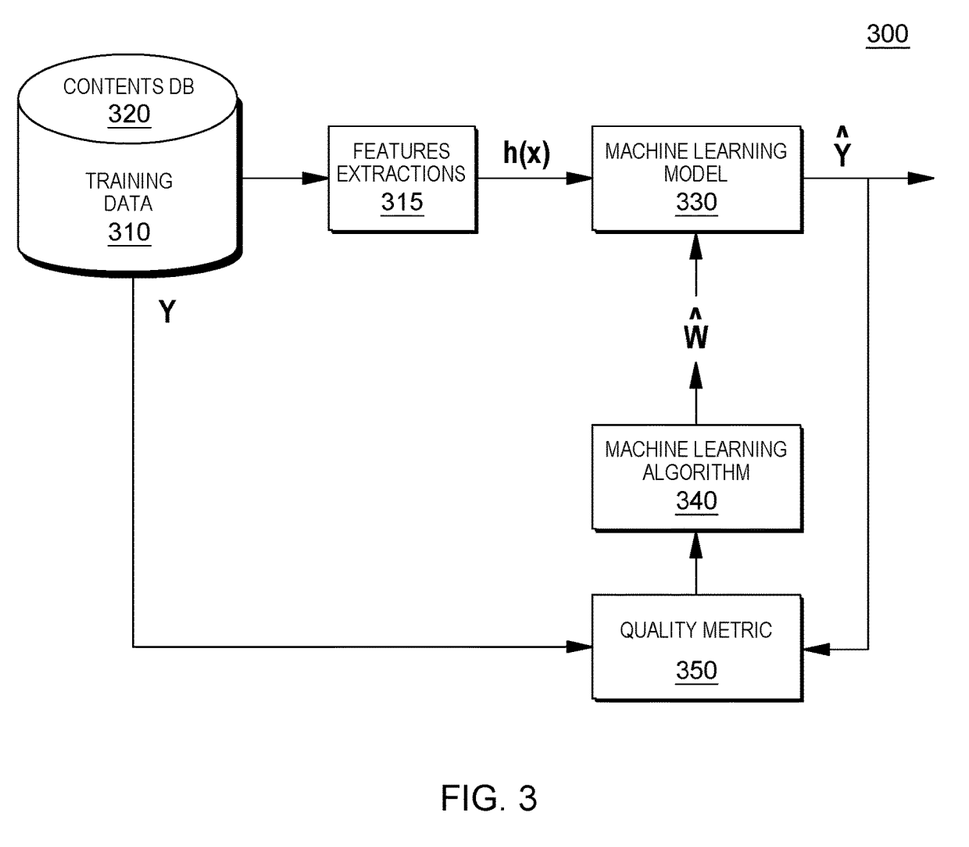
FIG. 3 is an illustration of various aspects of an environment in which aspects of embodiments of the present invention may be implemented.

As aforementioned, the program code may train the cognitive analysis algorithms based on patterns observed across all clients, or for a single client. FIG. 3 is an example of a machine learning training system 300 that can be utilized to perform cognitive analyses in embodiments of the present invention. Machine learning (ML) solves problems that cannot be solved by numerical means alone. In this ML-based example, program code extracts various features/attributes from training data 310, which may be resident in one or more databases 320 comprising various messages. The features are utilized to develop a predictor function, h(x), also referred to as a hypothesis, which the program code utilizes as a machine learning model 330. In identifying various features/attributes (e.g., patterns) in the training data 310, the program code may utilize various techniques including, but not limited to, mutual information, which is an example of a method that can be utilized to identify temporal features in an email message in an embodiment of the present invention. Further embodiments of the present invention utilize varying techniques to select features (elements, patterns, attributes, etc.), including but not limited to, diffusion mapping, principal component analysis, recursive feature elimination (a brute force approach to selecting features), and/or a Random Forest, to select the features. The program code may utilize a machine learning algorithm 340 to train the machine learning model 330 (e.g., the cognitive analysis algorithms utilized by the program code), including providing weights for the conclusions, so that the program code can prioritize various validity durations that may be indicated by the program code locating certain patterns (features) in the message text, in accordance with the predictor functions that comprise the machine learning model 330. The conclusions may be evaluated by a quality metric 250.

By selecting a diverse set of training data 310, the program code trains the machine learning model 330 to identify and weight various attributes (e.g., features, patterns) of messages. To utilize the aforementioned NN to implement an expiration date based on determining a validity period for a message, the program code obtains (or derives) the original values from a message to generate an array of values that to input into input neurons of the NN. Responsive to these inputs, the output neurons of the NN produce an array that includes the validity duration of the message. The program code implements the validity period and automatically expires the message, as illustrated in FIG. 1, based on the expiration date, which coincides with the end of the validity period.

In some embodiments of the present invention, the machine learning training system 300 that can be utilized to perform cognitive analyses in embodiments of the present invention may include a trained neuromorphic chip, specifically, or a neuromorphic processor, generally. Returning to FIG. 2, the neuromorphic processor or trained neuromorphic chip can be incorporated into the computing resources that process messages, in accordance with various aspects of the present invention, such as computing devices 270a-270n, email server 240, and/or the one or more servers 220 and may be included in the cognitive natural language processor. A neuromorphic processor may also be part of a separate computing resource that is communicatively coupled to one or more of the aforementioned resources.

One example of a trained neuromorphic chip that is utilized in an embodiment of the present invention is the IBM® TrueNorth chip, produced by International Business Machines Corporation. IBM® is a registered trademark of International Business Machines Corporation, Armonk, N.Y., U.S.A. Other names used herein may be registered trademarks, trademarks or product names of International Business Machines Corporation or other companies.

The IBM® TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has 256 programmable synapses that convey the signals between them. Hence, the total number of programmable synapses is just over 268 million (2^28). Memory, computation, and communication are handled in each of the 4096 neurosynaptic cores, so TrueNorth circumvents the von-Neumann-architecture bottlenecks and is very energy-efficient.

In an embodiment of the present invention, the neuromorphic chip or processor, incorporated or associated with the computing devices 270a-270c, email server 240, and/or the one or more servers 220, receives a message and provides a pattern analysis of the message to identify a set of attributes or features that indicate a duration for which the message is relevant/valid. The program code then implements an expiration date for the massage, based on the duration, based on the identifications by the neuromorphic chip or processor.

Some embodiments of the present invention include a computer-implemented method, a computer program product, and a computer system, where program code executed by one or more processors monitors a mailbox in an electronic mail system to identify a message destined for the mailbox. Based on identifying the message destined for the mailbox, the program code applies contextual language analyses to parse content of the message, where the content comprises a header and a body of the message to identify patterns in the content that indicate a temporal validity period for the message. The program code determines, based on identifying the patterns, the temporal validity period for the message and associating an expiration date with the message, the expiration date coinciding with an end of the temporal validity period. The program code expires the message, at the expiration date.

In some embodiments of the present invention, prior to expiring the message, the program code determines, based on one or more elements of the message, that the message is eligible for automatic expiration. The one or more elements may be predefined and stored in a memory communicatively coupled to the one or more processors.

In some embodiments of the present invention, the program code applying the contextual language analyses comprises the program code utilizing one or more of natural language processing algorithms or cognitive analytics to identify the patterns. The program code applying the contextual language analyses may include the program code utilizing the natural language processing algorithms to identify the patterns based on identifying one or more keywords within the body of the message.

In some embodiments of the present invention, the program code identifying the patterns include the program code identifying a sender of the message, where the sender indicates a static temporal validity period for the message.

In some embodiments of the present invention, the program code updates the contextual language analyses, based on an element selected from the group consisting of: the patterns, the expiration date, and the temporal validity period.

In some embodiments of the present invention, the program code analyzes a portion of messages handled in the electronic mail system utilizing heuristic techniques and cognitive learning. The program code generates the contextual language analyses, based on the analyzing.

In some embodiments of the present invention, the program code monitors, over a pre-defined period of time, actions taken by a user on given messages in the mailbox related to expiring the messages. The program code analyzes the given messages to locate recurrent attributes in messages expired by the user in similar temporal periods. The program code generates business rules based on the recurrent attributes. The program code updates the contextual language analyses to include the business rules. The program code may also monitor the mailbox in the electronic mail system to identify a second message destined for the mailbox. Based on identifying the second message destined for the mailbox, the program code may apply the updated contextual language analyses to parse content of the second message, where the content of the second message comprises a header and a body of the second message to identify patterns in the content of the second message that indicate a temporal validity period for the second message. The program code may determine, based on identifying the patterns in the content of the second message, the temporal validity period for the second message and associating an expiration date with the second message, the expiration date of the second message coinciding with an end of the temporal validity period of the second message. The program code may then expire the second message, at the expiration date of the second message.

In some embodiments of the present invention, the program code expires the message at the expiration date by: deleting the message, moving the message out of the mailbox, and/or removing the message from the electronic mail system. To select which action to use to expire the message, the program code may monitor manual actions taken by a user on messages in the mailbox to remove the messages from the mailbox and select the action most similar to the manual actions for automatically expiring the message.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing devices 270a-270c, email server 240, and/or the one or more servers 220 can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
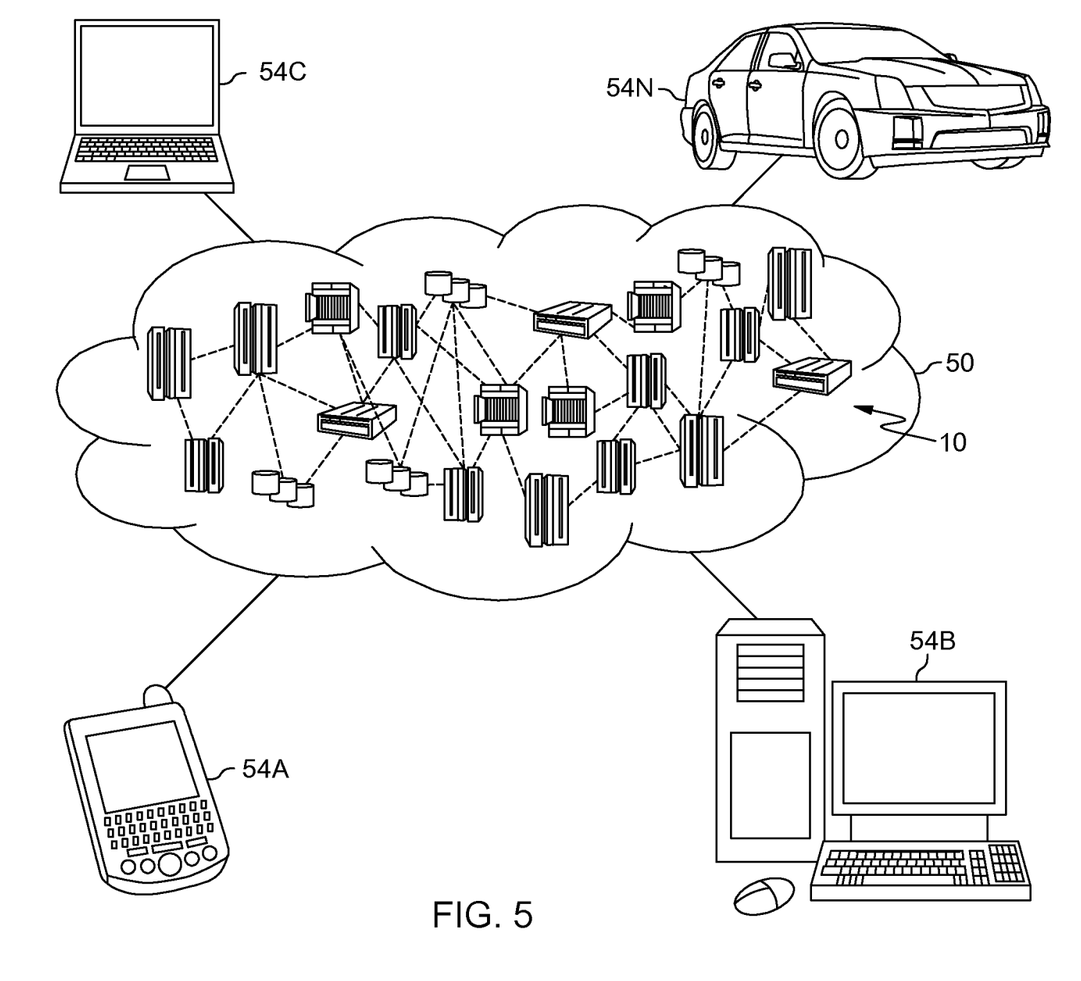
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
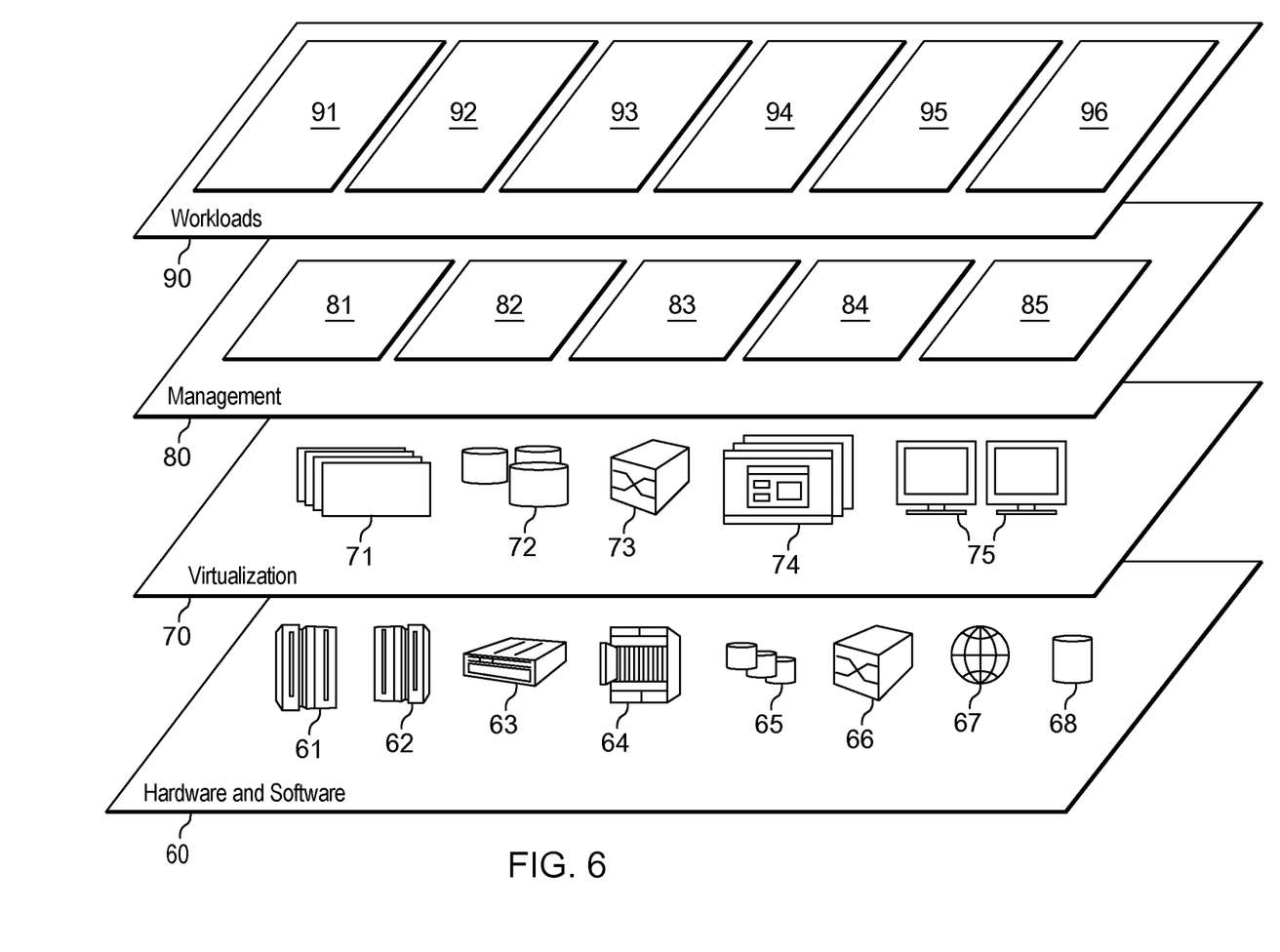
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing a cognitive analysis to determine a validity period for an electronic message in order to automatically expire the message 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   monitoring, by one or more processors, a mailbox in an electronic mail system to identify a message destined for the mailbox;
   based on identifying the message destined for the mailbox, applying, by the one or more processors, contextual language analyses to parse content of the message, wherein the content comprises a header and a body of the message to identify patterns in the content that indicate a temporal validity period for the message;
   determining, by the one or more processors, based on identifying the patterns, the temporal validity period for the message and associating an expiration date with the message, the expiration date coinciding with an end of the temporal validity period; and
   monitoring, by the one or more processors, over a predefined period of time, actions taken by a user on given messages in the mailbox related to expiring the messages;
   analyzing, by the one or more processors, the given messages to locate recurrent attributes in messages expired by the user in similar temporal periods;
   generating, by the one or more processors, business rules based on the recurrent attributes; and
   updating, by the one or more processors, the contextual language analyses to include the business rules.

2. The computer-implemented method of claim 1, further comprising:
   expiring, by the one or more processors, the message, at the expiration date; and
   prior to expiring the message, determining, by the one or more processors, based on one or more elements of the message, that the message is eligible for automatic expiration.

3. The computer-implemented method of claim 2, wherein the one or more elements of the message are predefined and stored in a memory communicatively coupled to the one or more processors.

4. The computer-implemented method of claim 1, wherein applying the contextual language analyses comprises utilizing one or more of natural language processing algorithms or cognitive analytics to identify the patterns.

5. The computer-implemented method of claim 4, wherein applying the contextual language analyses comprises utilizing the natural language processing algorithms to identify the patterns based on identifying one or more keywords within the body of the message.

6. The computer-implemented method of claim 1, wherein identifying the patterns comprises identifying a sender of the message, wherein the sender indicates a static temporal validity period for the message.

7. The computer-implemented method of claim 1, further comprising:
   updating, by the one or more processors, the contextual language analyses, based on an element selected from the group consisting of: the patterns, the expiration date, and the temporal validity period.

8. The computer-implemented method of claim 1, further comprising:
   analyzing, by the one or more processors, a portion of messages handled in the electronic mail system utilizing heuristic techniques and cognitive learning; and
   generating, by the one or more processors, the contextual language analyses, based on the analyzing.

9. The computer-implemented method of claim 1, further comprising:
   expiring, by the one or more processors, the message, at the expiration date.

10. The computer-implemented method of claim 9, further comprising:
    monitoring, by the one or more processors, the mailbox in the electronic mail system to identify a second message destined for the mailbox;
    based on identifying the second message destined for the mailbox, applying, by the one or more processors, the updated contextual language analyses to parse content of the second message, wherein the content of the second message comprises a header and a body of the second message to identify patterns in the content of the second message that indicate a temporal validity period for the second message;
    determining, by the one or more processors, based on identifying the patterns in the content of the second message, the temporal validity period for the second message and associating an expiration date with the second message, the expiration date of the second message coinciding with an end of the temporal validity period of the second message; and
    expiring, by the one or more processors, the second message, at the expiration date of the second message.

11. The computer-implemented method of claim 1, further comprising:
    expiring, by the one or more processors, the message, at the expiration date, wherein expiring the message at the expiration date comprises selecting an action from the group consisting of: deleting the message, moving the message out of the mailbox, and removing the message from the electronic mail system.

12. The computer-implemented method of claim 11, wherein the selecting an action comprises:
    monitoring, by the one or more processors, manual actions taken by a user on messages in the mailbox to remove the messages from the mailbox; and
    selecting, by the one or more processors, the action most similar to the manual actions for automatically expiring the message.

13. A computer program product comprising:
    a computer readable storage medium readable by one or more processors and storing instructions for execution by the one or more processors for performing a method comprising:
    monitoring, by the one or more processors, a mailbox in an electronic mail system to identify a message destined for the mailbox;
    based on identifying the message destined for the mailbox, applying, by the one or more processors, contextual language analyses to parse content of the message, wherein the content comprises a header and a body of the message to identify patterns in the content that indicate a temporal validity period for the message;
    determining, by the one or more processors, based on identifying the patterns, the temporal validity period for the message and associating an expiration date with the message, the expiration date coinciding with an end of the temporal validity period; and monitoring, by the one or more processors, over a pre-defined period of time, actions taken by a user on given messages in the mailbox related to expiring the messages;

analyzing, by the one or more processors, the given messages to locate recurrent attributes in messages expired by the user in similar temporal periods;

generating, by the one or more processors, business rules based on the recurrent attributes; and updating, by the one or more processors, the contextual language analyses to include the business rules.

14. The computer program product of claim 13, further comprising:

expiring, by the one or more processors, the message, at the expiration date; and prior to expiring the message, determining, by the one or more processors, based on one or more elements of the message, that the message is eligible for automatic expiration.

15. The computer program product of claim 14, wherein the one or more elements of the message are predefined and stored in a memory communicatively coupled to the one or more processors.

16. The computer program product of claim 13, wherein applying the contextual language analyses comprises utilizing one or more of natural language processing algorithms or cognitive analytics to identify the patterns.

17. The computer program product of claim 16, wherein applying the contextual language analyses comprises utilizing the natural language processing algorithms to identify the patterns based on identifying one or more keywords within the body of the message.

18. The computer program product of claim 13, wherein identifying the patterns comprises identifying a sender of the message, wherein the sender indicates a static temporal validity period for the message.

19. The computer program product of claim 13, further comprising:

updating, by the one or more processors, the contextual language analyses, based on an element selected from the group consisting of: the patterns, the expiration date, and the temporal validity period.

20. A system comprising:

a memory;

one or more processors in communication with the memory;

program instructions executable by the one or more processors via the memory to perform a method, the method comprising:

monitoring, by the one or more processors, a mailbox in an electronic mail system to identify a message destined for the mailbox;

based on identifying the message destined for the mailbox, applying, by the one or more processors, contextual language analyses to parse content of the message, wherein the content comprises a header and a body of the message to identify patterns in the content that indicate a temporal validity period for the message;

determining, by the one or more processors, based on identifying the patterns, the temporal validity period for the message and associating an expiration date with the message, the expiration date coinciding with an end of the temporal validity period; and monitoring, by the one or more processors, over a pre-defined period of time, actions taken by a user on given messages in the mailbox related to expiring the messages;

analyzing, by the one or more processors, the given messages to locate recurrent attributes in messages expired by the user in similar temporal periods;

generating, by the one or more processors, business rules based on the recurrent attributes; and updating, by the one or more processors, the contextual language analyses to include the business rules.

\* \* \* \* \*